United States Patent [19]
Grene

[11] Patent Number: 5,352,024
[45] Date of Patent: Oct. 4, 1994

[54] VEHICLE SAFETY RESTRAINT

[76] Inventor: Ethel Grene, 816-D Skokie Rd., Wilmette, Ill. 60091

[21] Appl. No.: 69,588

[22] Filed: May 27, 1993

Related U.S. Application Data

[63] Continuation-in-part of Ser. No. 667,816, Mar. 12, 1991, Pat. No. 5,215,354, which is a continuation-in-part of Ser. No. 656,288, Feb. 15, 1991, Pat. No. 5,156,436.

[51] Int. Cl.$^5$ ............................................. B60R 22/12
[52] U.S. Cl. .................................... 297/485; 297/467; 297/466
[58] Field of Search ................. 297/466, 467, 485, 464

[56] References Cited

U.S. PATENT DOCUMENTS

| | | |
|---|---|---|
| 928,305 | 7/1909 | Carrington . |
| 1,298,615 | 3/1919 | Wilkinson . |
| 2,451,007 | 10/1948 | White ............................ 297/485 X |
| 2,619,157 | 11/1952 | Guyton et al. . |
| 3,275,373 | 9/1966 | Card . |
| 3,513,930 | 5/1970 | Brown, Jr. . |
| 3,578,383 | 5/1971 | Earl . |
| 3,604,750 | 9/1971 | Doering ........................ 297/485 X |
| 3,694,029 | 9/1972 | Noble et al. . |
| 3,779,599 | 12/1973 | Gottfried . |
| 3,901,550 | 8/1975 | Hamy . |
| 4,035,595 | 7/1977 | Tolfsen . |
| 4,190,287 | 2/1980 | Lemisch et al. . |
| 4,205,670 | 6/1980 | Owens ........................... 297/485 X |
| 4,289,352 | 9/1981 | Ashworth . |
| 4,402,548 | 9/1983 | Mason . |
| 4,431,234 | 2/1984 | Lacey . |
| 4,488,691 | 12/1984 | Lorch . |
| 4,492,007 | 1/1985 | Tolfsen . |
| 4,509,797 | 4/1985 | Mullaly ............................ 297/466 |
| 4,610,463 | 9/1986 | Efrom . |
| 4,648,625 | 3/1987 | Lynch . |
| 4,670,951 | 6/1987 | Tolfsen . |
| 4,730,875 | 3/1988 | Yoshitsugu . |
| 4,733,443 | 3/1988 | Tolfsen . |
| 4,747,969 | 7/1988 | Tolfsen . |
| 4,762,364 | 8/1988 | Young . |
| 4,770,468 | 9/1988 | Shubin . |
| 4,790,601 | 12/1988 | Burleigh et al. . |
| 4,796,919 | 1/1989 | Linden . |
| 4,832,366 | 5/1989 | Corbett et al. . |
| 4,834,459 | 5/1989 | Leach ............................ 297/485 X |
| 4,834,460 | 5/1989 | Herwig . |
| 4,848,793 | 7/1989 | Huspen et al. . |
| 4,874,203 | 10/1989 | Henley ............................ 297/250 |
| 5,005,865 | 4/1991 | Kruse ........................... 297/467 X |
| 5,042,878 | 8/1991 | Collins ............................ 297/467 |
| 5,257,854 | 11/1993 | Korneliussen . |

FOREIGN PATENT DOCUMENTS

| | | |
|---|---|---|
| 549157 | 11/1957 | Canada . |
| 1238617 | 4/1967 | Fed. Rep. of Germany . |
| 2238749 | 2/1974 | Fed. Rep. of Germany . |
| 3519346 | 12/1986 | Fed. Rep. of Germany . |
| 1124239 | 6/1956 | France . |
| 2491311 | 10/1980 | France . |

OTHER PUBLICATIONS

Mothercare Spring and Summer 1991, p. 178.
Mothercare the Natural First Choice, 1992, p. 122.

*Primary Examiner*—Peter R. Brown
*Attorney, Agent, or Firm*—Leydig, Voit & Mayer, Ltd.

[57] ABSTRACT

A vehicle safety restraint for pregnant women is provided which includes first and second restraint members that, in the operative mode, are spaced from the gravid uterus region of the woman thereby avoiding trauma in the latter region if the vehicle should suddenly stop. The first restraint members, when in an operative mode, encompass the upper torso region of the woman. The second restraint members, when in an operative mode, encompass in the groin area thigh regions of the woman.

7 Claims, 10 Drawing Sheets

VEHICLE SAFETY RESTRAINT

This application is a continuation-in-part of my application, Ser. No. 667,816, filed Mar. 12, 1991 to be patented as U.S. Pat. No. 5,215,354, which is a continuation-in-part of my application Ser. No. 656,288, filed Feb. 15, 1991, now patented as U.S. Pat. No. 5,156,436.

BACKGROUND OF THE INVENTION

The utilization of seat and shoulder belts when riding in a motor vehicle has become mandatory or highly recommended in most geographical areas throughout the United States. Safety studies have established that in most types of accidents involving motor vehicles the occupants utilizing seat and shoulder belts at the time avoided serious injuries to a much greater extent than those not utilizing such belts. Where, however, the occupant of the vehicle is a pregnant woman, the utilization of the conventional seat and shoulder belts provided in the vehicle can cause serious trauma to the pregnant (gravid) uterus in the event the vehicle is involved in an accident or a sudden stop. Such trauma is due to the arrangement, location and/or interconnection of such belts whereby they dangerously impinge upon the vulnerable gravid uterus and frequently cause injury to the fetus and placenta located in such region.

In an attempt to rectify this situation a protective shield such as disclosed in U.S. Pat. No. 4,610,463 has been proposed. Such a device, however, enhances rather than diminishes the dangerous impingement of the gravid uterus because the force is concentrated by the shield at such body region. Furthermore, such a shield is uncomfortable to the occupant because of size and texture and may interfere with manual maneuvers required for safe operation of the vehicle where the user is the driver.

Various vehicle safety restraints are presently available for infants. However, while such restraints are generally suitable for infants up to the age of about four years they are not, however, suitable for children from ages about four to ten years because such a child could not fit into and be safely accommodated in the bucket type seat which normally comprises a major component of such a restraint. The shoulder and lap (seat) belts standard in most current model vehicles are sized and shaped to accommodate adults of normal physical dimensions and are not suitable for children of the age of about four to ten. As a result, children in this age bracket are prone in many instances not to use the restraints at all or use only the lap belt with the shoulder belt being tucked between the back of the child and the vehicle seat back. Using only the lap belt for the child has been found in many instances to be a dangerous practice because of the location of such lap belt with respect to the pelvis region of the child. Upon a sudden stop of the vehicle severe impinging force may be exerted by the lap belt on the pelvis and lower abdominal regions of the child causing serious and sometimes fatal internal injuries to occur.

SUMMARY OF THE INVENTION

Thus, a vehicle safety restraint for use by both pregnant women and children within an age range from about 4 years to about 10 years has been provided which avoids all of the aforenoted shortcomings associated with prior vehicle restraints.

The improved vehicle safety restraint is compact, comfortable to the user and may be readily transferred between various vehicles.

The improved vehicle safety restraint utilizes the existing, conventional safety belts or straps provided on the vehicle to secure such restraint in a proper location on the vehicle seat.

The improved restraint is capable of comfortably accommodating either pregnant women or children of varying physical dimensions.

Further and additional advantages of the improved restraint will become apparent from the description, accompanying drawings and appended claims.

In accordance with one embodiment of the invention, a vehicle safety restraint is provided which includes a body-supporting unit which is adapted to be removably secured in place on a vehicle seat. The unit is adapted to accommodate a pregnant woman while in a seated position and includes a lower section which subtends and supportingly engages the pelvis and thigh regions of the seated woman. Extending angularly upwardly from the unit lower section is an upper section which is interposed between the vehicle seat back and the dorsal torso region of the woman. Attached to the unit sections is a harness means which engages and retains the woman within the unit. The harness means includes a plurality of flexible first restraint members mounted on peripheral portions of the unit upper section for releasably encompassing the woman's upper torso region. The harness means also includes a plurality of flexible second restraint members which are spaced from and independent of the first restraint members. The second restraint members are attached to the unit lower section and are adapted to releasably encompass thigh regions of the seated woman. When the restraint members are in an operative mode, they are spaced from the woman's gravid uterus region thus, avoiding impingement thereof.

In accordance with another embodiment of the invention, a vehicle safety restraint is provided which includes a pliable unit which can be removably fitted to the seat back section of any vehicle seat. The unit is formed by a plurality of straps which are arranged so as to encompass the seat back section. Two of the unit's straps extend horizontally around the seat back in a vertically spaced relationship to embrace the upper and lower sections of the vehicle seat back. In addition to the two horizontal straps, the unit includes a strap which encircles the seat back along the longitudinal centerline of the seat back. The straps of the unit are secured together at various points to provide support and proper placement of the vehicle safety restraint. The vehicle safety restraint is provided with first restraint and second restraint members which are secured to the pliable unit. The flexible first restraint members releasably encompass the woman's upper torso region, while the second restraint members are adapted to releasably encompass the thigh regions of the seated woman. As with the previous embodiment, when the restraint members are in an operative mode, they are spaced from the woman's gravid uterus region, thus, avoiding impingement thereon.

In accordance with yet another embodiment of the invention, a vehicle safety restraint includes a pliable unit which can be removably fitted to any vehicle and a shoulder strap diagonally disposed with reference to the centerline of the seat back so as to engage a seated woman in her chest area, above the gravid uterus. A pair of second restraint members are secured to the pliable unit and adapted to releasably encompass the thigh regions of the seated woman. Similarly to the other embodiments, when the restraint members are in an operative mode, they are spaced from the seated woman's gravid uterus. In accordance with still another embodiment of the invention, a vehicle safety restraint includes a pliable unit which can be removably fitted to any vehicle seat. The unit includes a strap which encircles the lower portion of the seat back in a horizontal orientation. The vehicle safety restraint includes a centrally located second restraint member which is connected to the pliable unit through a pliable extension. The centrally located second restraint member works in conjunction with another horizontally disposed second restraint member. In operation, the centrally disposed member engages and deforms the horizontal restraint member so that the horizontal restraint member conforms to the contour of the seated woman's thighs and anchors between her legs. As a result, each thigh region of the woman is engageably encompassed in such a manner that in the event of a sudden stop or collision, the horizontal restraint member is prevented from riding up on the woman, thereby avoiding impingement upon the gravid uterus region of the pregnant woman.

DESCRIPTION

For a more complete understanding of the invention reference is made to the drawings wherein.

Figures 5, 6:
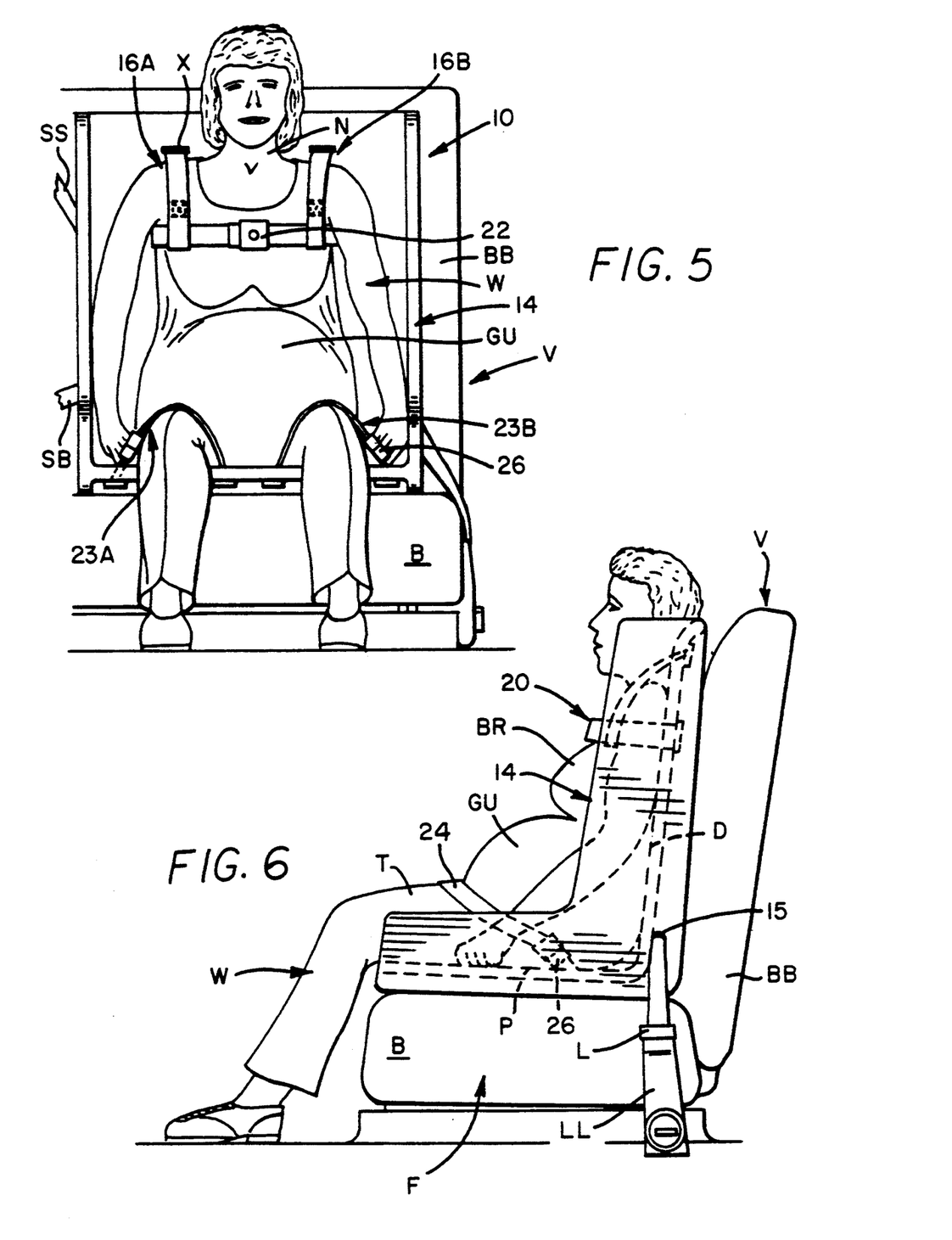
FIGS. 5 and 6 are front and side views, respectively, of the restraint of the FIG. 1 shown occupied by a pregnant woman.

Referring now to the drawings and more particularly to FIGS. 5 and 6, one embodiment of a vehicle safety restraint 10 is shown being used by a pregnant woman W while riding in a motor vehicle V. At the present time, seat belts SB, sometimes referred to as lap belts, and shoulder belts SS are standard equipment on most present day passenger motor vehicles, particularly for occupants of the front seat F. The seat and shoulder belts may vary in size and shape and in the way they are mounted within the vehicle; however, there is normally provided sets of belts for the driver and at least one front seat passenger. Each set includes an extendable lap belt and shoulder belt. The lap belt normally has one end thereof disposed within cartridge or case, not shown, which is anchored at a convenient location on the vehicle body frame adjacent one side of the vehicle seat F. The opposite end of the belt is exposed and provided with a lock component L, see FIG. 6, which is adapted to manually engage a complemental lock component LL which is anchored at a second location laterally spaced a substantial distance from the cartridge. The cartridge is provided with a suitable braking means which automatically stops the extension, or payout, of the belt from the cartridge when the belt is subjected to a sudden jerk or pull.

A similar arrangement may be provided for the shoulder belt except that the cartridge therefor may be anchored at a different location, such as on a door post. The opposite end of the shoulder belt may either be secured to the exposed seat belt behind the lock component L, or it may also have a separate lock component which manually engages a complemental lock component, not shown, located proximate lock component LL. The construction and mounting of the seat and shoulder belts by themselves are well known and are not the claimed invention.

Under normal conditions, the conventional arrangement of the shoulder strap and lap belt with respect to the seated adult is comfortable as well as an effective restraint in case of an accident or sudden stop. Where however, the occupant is a pregnant woman, the arrangement of the conventional shoulder and lap belts when in the operative mode, can produce severe trauma to the woman as well as the developing placenta and fetus within the woman. Such trauma can be particularly severe when the woman is in the stage of her pregnancy wherein she has a gravid uterus region extending above the pubic bone, into the abdominal area. Heretofore, when the woman is at such a stage of her pregnancy, she may for reasons of comfort and perceived risk, omit the use of the belts altogether or attempt to use only the shoulder belt. When the woman forgoes using the belts altogether, she exposes herself to the hazard of her body and head striking the dashboard, steering wheel and/or windshield or being thrown from vehicle in case of collision. When the woman utilizes only the shoulder belt, she subjects herself to the danger of her knees striking the dashboard causing severe fracture of the bones located in the legs and hips or severe separation of the knee and hip joints.

Figure 3:
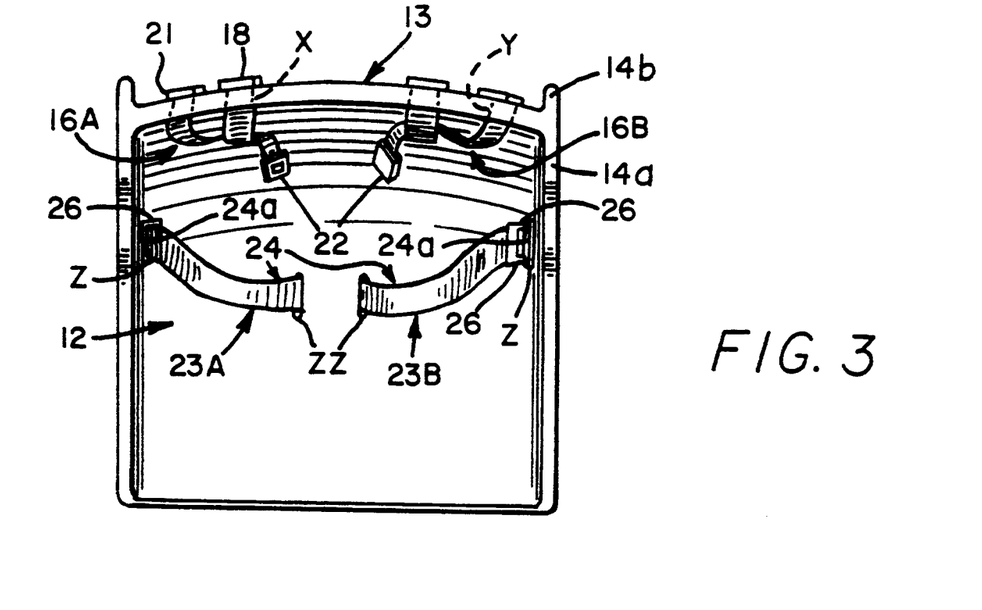
FIG. 3 is a top view of the restraint of FIG. 1.
Figure 4:
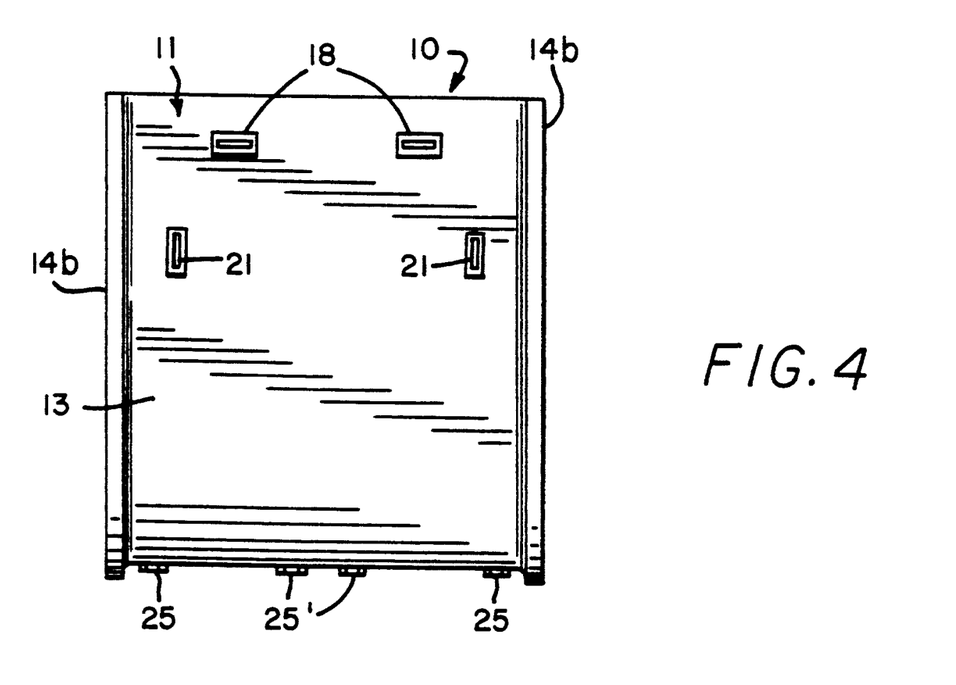
FIG. 4 is a fragmentary rear elevational view of the restraint of FIG. 1.

The restraint 10 hereinafter described avoids such problems relating to pregnant women in a simple yet effective way. Restraint 10 includes a chairlike body-supporting unit 11 which is preferably of one piece construction and is formed of lightweight metal or lightweight high impact plastic. The unit may be produced in a conventional way (i.e. molding, thermoforming, etc.) and includes a lower section 12, which rests upon the substantially horizontal bottom section B of the vehicle seat F so as to subtend and supportingly engage the pelvis and thigh regions P and T respectively, of the body. Extending angularly upwardly from the rear of the lower section 12 is an upper section 13. When the restraint is being used, the upper section 13 is interposed between the dorsal torso region D of the woman W and the back support section BB of the vehicle seat F. To add strength and rigidity to the unit 11 flange-like side sections 14 may be provided which interconnect corresponding side edge portions of the lower and upper sections. The side sections 14 preferably project forwardly and rearwardly from the unit upper section 13 and project upwardly and downwardly from the unit lower section 12, see FIGS. 3 and 4. The surfaces of the upper, lower and side sections of the unit which are adjacent the woman occupying the unit may be contoured to conform more closely to the body regions engaging same and may be covered with suitable padding, not shown, for added comfort.

The forwardly and upwardly projecting portions 14a of the side sections 14 assist in restraining lateral shifting of the woman relative to the unit.

Figure 1:
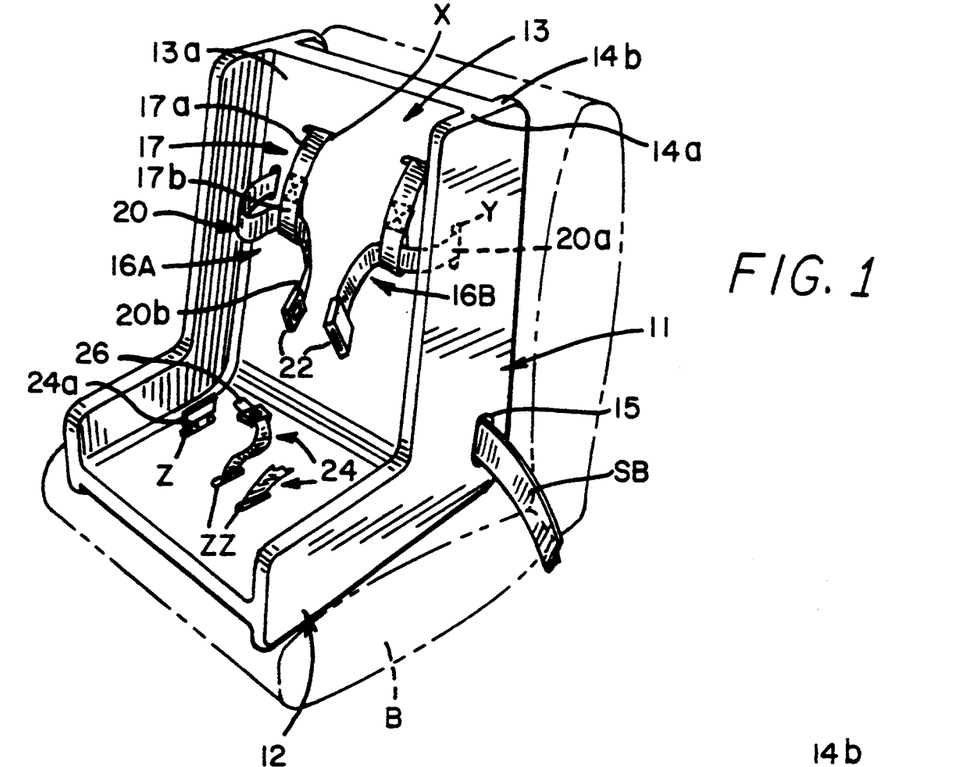
FIG. 1 is a fragmentary perspective view of one embodiment of the vehicle safety restraint for pregnant woman shown unoccupied and secured in place on a vehicle seat.
Figure 2:
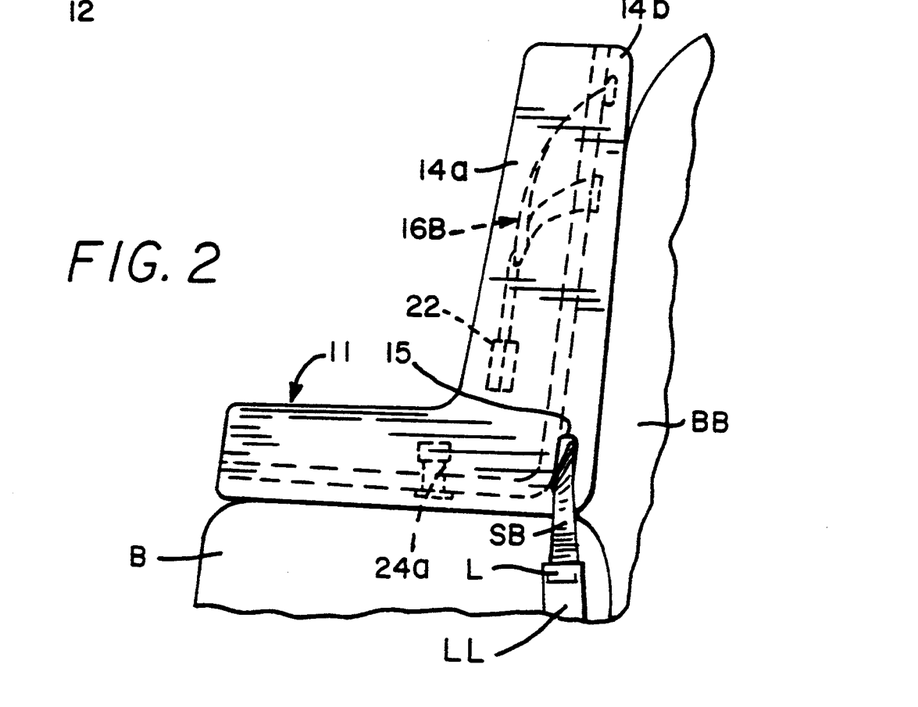
FIG. 2 is a right side elevational view of the restraint of FIG. 1.

As seen in FIG. 2, the rearwardly extending portions 14b of the side sections 14 near the lower section 12 may be provided with laterally aligned openings 15 which are sized to conveniently accommodate a portion of the vehicle's standard seat belt SB or portions of both the seat and shoulder belts, see FIG. 6, when the unit is to be secured in place on the vehicle seat. The amount of rearward extension of the side section portions 14b and the thickness thereof should be such as to readily withstand any forces exerted thereon by the belt, or belts, accommodated in the openings 15 when the vehicle is caused to suddenly stop.

In some instances where one of the lock components for the standard lap belt, which is located between the driver and front seat passenger, extends upwardly a substantial amount, it might be awkward and difficult to utilize the standard lap and shoulder belts to secure the unit in place on the vehicle seat. In such a situation a separate attaching strap, not shown, may be utilized which will embrace the back section of the vehicle front seat. The separate attaching strap is inserted through the laterally aligned openings 15 formed in the unit 11. The ends of the separate attaching straps are provided with complemental lock components.

As seen in FIGS. 1-4, the unit upper section 13 is provided with a pair of first restraint members arranged in complemental sets 16A and 16B. Each set is of like construction and includes a flexible shoulder-engaging strap 17 having one end 17a thereof extending through a suitable opening X, see FIG. 1, formed in the upper end portion 13a of unit section 13. The strap end 17a terminates behind unit section 13 and is affixed to a suitable bracket 18 mounted on the backside of unit section 13, see FIG. 4. The other end 17b of the strap 17 is preferably connected to a transversely extending flexible chest strap 20. One end 20a of strap 20 extends through a suitable opening Y formed in the upper end portion 13a of section 13, see FIGS. 1 and 3 and is affixed to a suitable bracket 21 mounted on the backside of section 13, see FIG. 4. The opposite, or exposed, end 20b of strap 20 is provided with a buckle component 22. The straps 17 and 20 are preferably formed of suitable synthetic material commonly used for the standard vehicle seat belts SB and shoulder belts SS.

When the sets of first restraint members 16A and 16B are in the operative mode, the buckle components 22 interlock with one another thereby forming a harness for the woman's upper torso region, see FIGS. 56 and 6. It will be noted that the straps 17 are laterally spaced from one another and are disposed on opposite sides of the neck region N. The chest straps 20, on the other hand, are disposed above the breast region BR of the woman. Both straps 17 and 20 may be provided with conventional devices, not shown, for adjusting the lengths thereof so as to properly accommodate the various regions of the body. Because of the flexibility of the strap material, the straps will readily conform substantially to the contour of the body region engaged thereby. As seen in FIG. 5, the chest straps 20 extend under the arms of the woman thereby permitting unrestricted arm movement.

The thigh regions T of the woman are encompassed by a pair of second restraint members 23A, 23B. Each member 23A, 23B is of like construction and may be formed of the same synthetic material used for the aforedescribed first restraint members. Each member 23A, 23B may include a pair of complementary strap segments 24. One end 24a of segment 24 extends through a suitable opening Z formed in the unit lower section 12 and is affixed to a bracket 25 mounted on the underside of the unit lower section 12. One end of the other segment 24 of each pair extends through another opening ZZ which is spaced laterally inwardly from the corresponding opening Z. A suitable bracket 25' is secured to the concealed surface of the lower section and is aligned with opening ZZ. The bracket 25' provides an anchor for the one end of one segment of the pair.

It should be noted in the illustrated embodiment that all of the brackets 18, 21, 25 and 25' are disposed between the side sections 14 and project from the respective unit sections 12 and 13 a shorter distance than the side section portions 14b. Thus, the brackets and strap ends affixed thereto do not interfere with the stability of the unit when positioned on the vehicle seat F.

The opposing ends 24b of the strap segments 24 may be provided with suitable buckle components 26. As in the case of the harness straps 17 and 20, the strap segments 24 may include suitable means, not shown but commonly utilized in safety straps and belts, for adjusting the lengths thereof to comfortably accommodate the body region encompassed thereby. Thus, when the restraint members 23A and 23B are in the operative mode, the woman's thigh regions T are securely retained in place on the unit lower section 12. It should be noted in FIG. 6 that the restraint members 23A and 23B engage the thigh regions in the groin area and below the woman's gravid uterus region GU. Thus, neither the first and second restraint members 16A and 16B and 23A and 23B, when in the operative mode, impinge upon the critical gravid uterus region GU and thus, no trauma to the vulnerable gravid region due to the restraint members is experienced by the woman.

Figure 7:
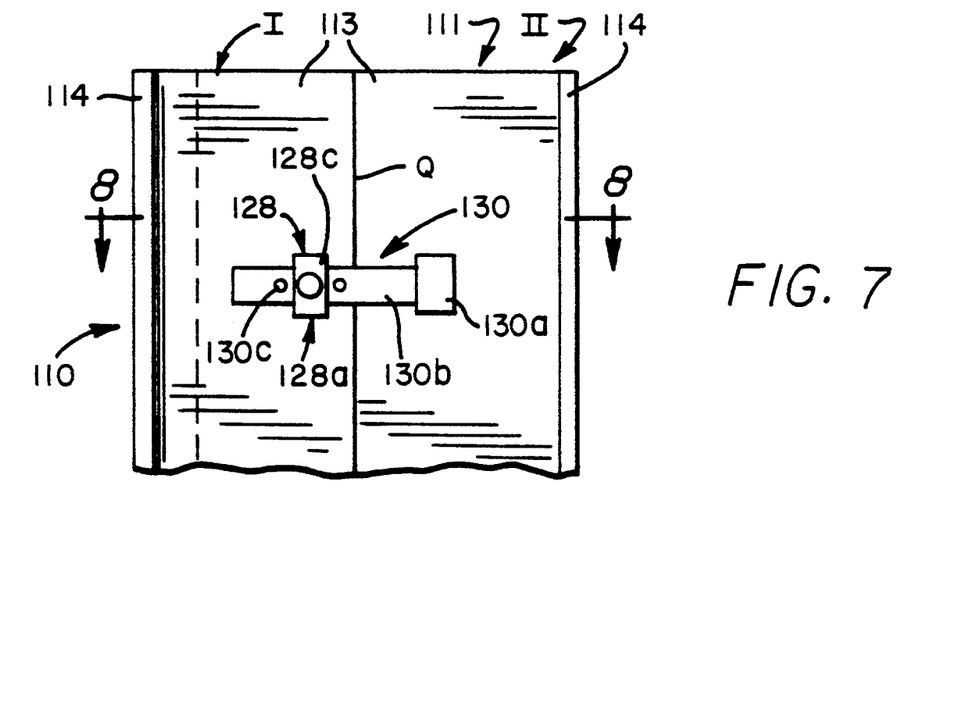
FIG. 7 is a fragmentary rear elevational view of a second embodiment of vehicle safety restraint with a laterally adjustable body supporting unit.
Figure 8:
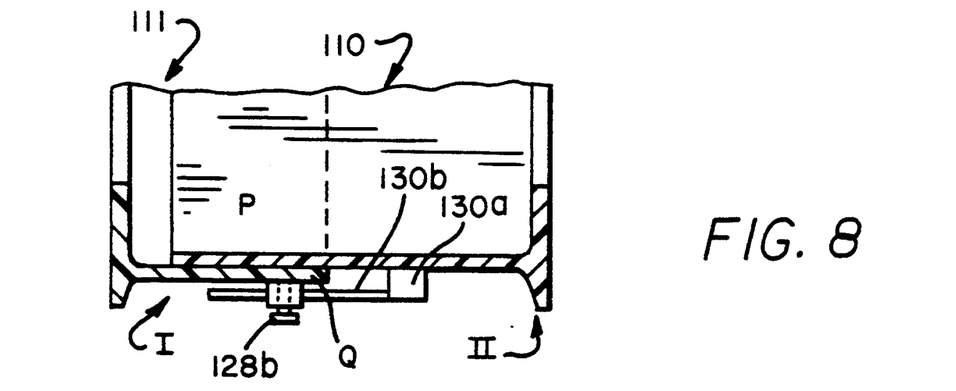
FIG. 8 is a fragmentary sectional view taken along line 8—8 of FIG. 7.
Figure 9:
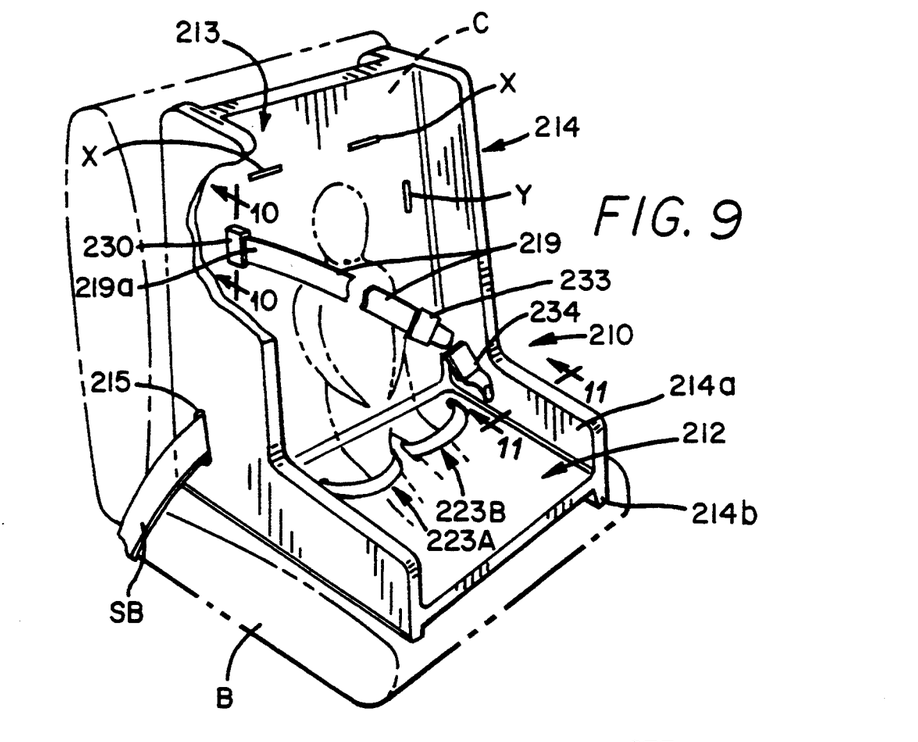
FIG. 9 is a fragmentary perspective front view of a third embodiment of the improved vehicle safety restraint shown unoccupied and adapted to accommodate a young child, the latter being shown in phantom lines.
Figure 10:
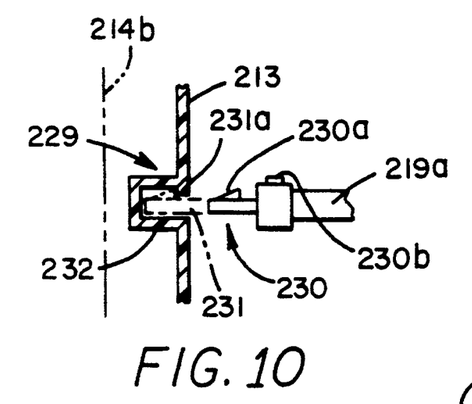
FIGS. 10 and 11 are enlarged fragmentary sectional views taken along lines 10—10 and 11—11, respectively, of FIG. 9.

FIGS. 7 and 8 disclose a modified restraint 110 having a body-supporting unit 111 which includes a feature whereby the lateral, or width, dimension of the unit can be varied to comfortably accommodate women of varying physical or anatomical characteristics. Unit 111 is formed of two components I and II which are similar in configuration. Each component includes a partial lower section, not shown, a partial upper section 113 extending angularly upwardly therefrom, and one side section 114. The width dimension of component II, in the illustrated embodiment, is greater than the corresponding dimension of the component I so that when the components are assembled to form the unit 111, the inner edge portion P of component II will overlie the inner edge portion Q of component I, see FIG. 8. The backside of each component is provided with adjustable connectors 128, 130 which cooperate with one another to allow the amount of overlap of the inner edge portions P, Q to be selectively maintained. Connector 128 may be an inverted C-shaped bracket 128a which is fixedly secured to the backside of component I and cooperates therewith to form a laterally extending opening. Connector 130, on the other hand, may include a post-like bracket 130a which is affixed to the backside of component II. Extending laterally from and affixed to the distal, or outer, end of bracket 130a is an elongate tongue or finger 130b which may be provided with a plurality of longitudinally spaced holes 130c. The components I, II are manually adjusted so that a selected hole is aligned with an adjustable pin 128b mounted on the center segment 128c of the C-shaped bracket 128. The pin 128b may be spring-biased towards the backside of component I. To release the pin from locking engagement with a selected hole 130c merely requires an outward pulling force to be applied to an enlarged exposed end of the pin. If desired and in lieu of the pin being spring-biased, it may be threaded into an internally threaded opening formed in the bracket center segment 128c.

While only one pair of connectors is shown in FIGS. 7 and 8, additional pairs of connectors, not shown, are mounted on the concealed surfaces of the lower and upper sections of components I and II. Other forms of connectors than shown may be utilized to secure the unit components I and II in assembled relation. In addition the configuration of the unit upper and lower sections may be varied from that shown without departing from the scope of the invention. For example, the forward and upward projecting portions 14a, 114a of the side sections 14 and 114 may be reduced or eliminated, if desired, to facilitate the woman getting into or out of the unit.

FIGS. 9–12 disclose a further modified embodiment of the improved vehicle safety restraint 210 which is capable of accommodating either a pregnant woman or a child C of about four to about ten years old. The child is shown in phantom lines in FIG. 9. The principal differences between restraints 10 and 210 are that in the latter the upper, or first set of restraint members 16A and 16B, as shown in FIG. 1, are capable of being detached from the upper section 213 of unit 211 when desired. Thus, when restraint 210 is to be used to accommodate the child C, the sets of restraint members 16A and 16B are detached from the unit 211. In place thereof, a supplementary shoulder strap section 219 is utilized. The upper end 219a of strap section 219 is provided with a conventional lock component 230, see FIG. 10, which is adapted to engage a first supplementary lock component 229 which includes a suitable opening 231 formed in the upper section 213 of unit 211 adjacent one side edge of unit 211. Opening 231 is spaced from opening YY through which one end 20a of one chest strap 20 would normally extend. Aligned with opening 231 and extending rearwardly from the unit upper section is a pocket 232 which forms a part of the first supplementary lock component 229. One side of opening 231 has a depending tongue 231a which coacts with a spring-loaded lug 230a carried by lock component 230 to effect interlocking of the components. A finger-actuated button 230b may be provided on component 230 to effect unlocking of components 230 and 229, when desired. Various other types of lock components than those shown may be utilized.

In lieu of providing a separate opening 231 for the first supplementary lock component 229, the openings X and Y already formed in the unit upper section 213 to normally accommodate the respective ends of the shoulder and chest straps 17, 20, may be configured to accommodate the lock component 230 carried on the end 219a of the supplemental strap section 219. In this latter arrangement either opening X or Y disposed to one side of the unit upper section may be utilized depending upon the size of the child being accommodated in the unit 211.

Figure 11:
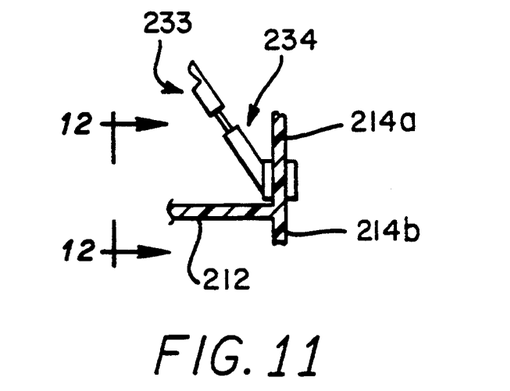
Figure 12:
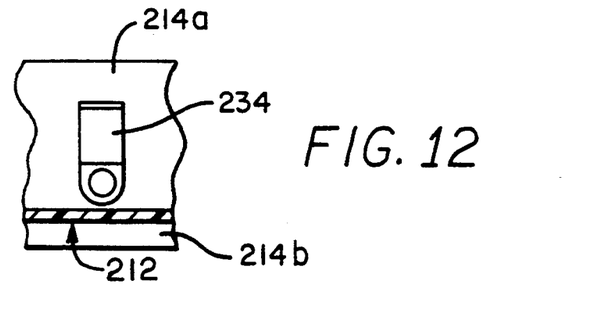
FIG. 12 is a fragmentary elevational view taken along line 12—12 of FIG. 11.
Figure 13:
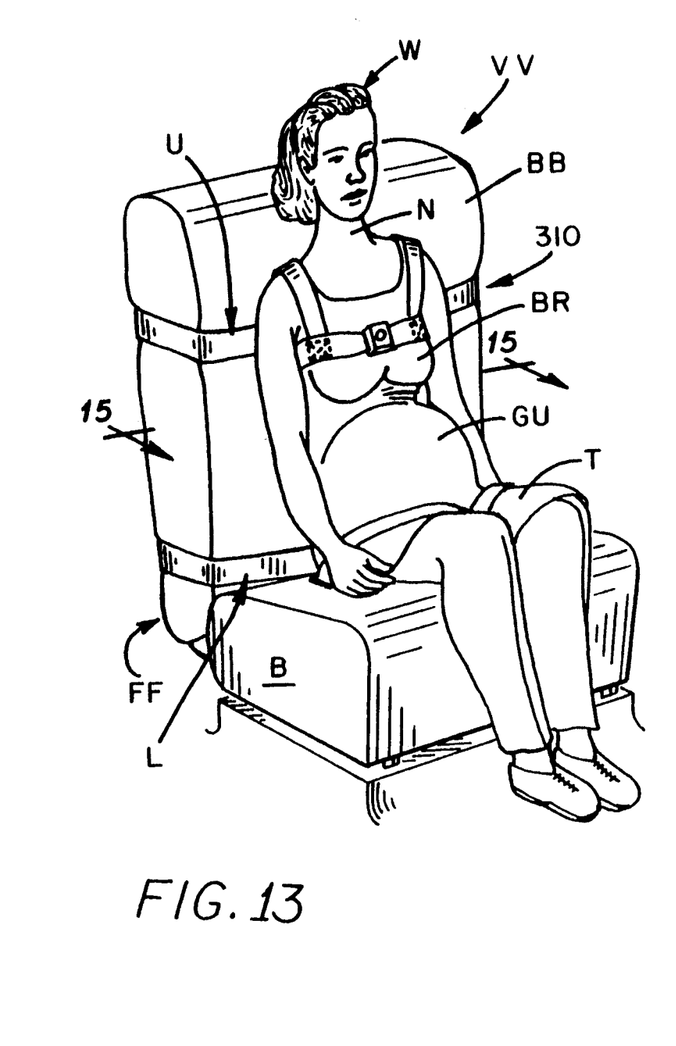
FIG. 13 is a fragmentary perspective view of a fourth embodiment of the improved vehicle restraint shown mounted on the back section of a conventional vehicle seat and with a pregnant woman occupying the seat.

The opposite, or lower, end of strap section 219 may be provided with a similar lock component 233, see FIG. 11, which is adapted to engage a second supplementary lock component 234. Component 234 may be pivotally attached to the upwardly projecting portion 214a of the side section 214 of the unit 211. The second supplementary lock component 234 is located proximate a side edge portion of unit 211. Strap section 219 may be provided with conventional means, not shown, for varying the length thereof so as to properly engage the front torso region of the accommodated child. Other than the additional supplementary lock components 229 and 234, the units 11 and 211 are basically the same. The sets of lower restraint members 23A and 23B provided on unit 11 may be provided in a like manner as sets of lower restraint members 223A and 223B on unit 211. Restraint members 223A and 223B encompass the thigh regions of the accommodated child in the vicinity of the groin. When the members 223A and 223B are properly encompassing the child's thigh regions, they are safely disposed below the pelvis region and will not cause serious internal injury to the pelvis or abdominal regions of the child if the vehicle should come to a sudden stop. Unit 211 may incorporate the laterally adjustable feature of the afore-described unit 111. All of the restraints 10, 110 and 210 may be readily utilized in either the front or rear seat of a vehicle. Furthermore, in all instances, the unit is retained on the vehicle seat by utilizing the safety belts provided as standard equipment on the vehicle and may be readily transferred between various vehicles.

FIGS. 13–16 disclose a fourth embodiment 310 of the improved vehicle restraint which can be fitted to the seat back section BB of any vehicle seat FF which is so constructed as to permit access to the posterior and inferior as well as the anterior aspect of the seat back section BB. Such a seat back section BB is normally present on the driver's seat and front passenger seat of all vehicles, and sometimes on the middle seats of a station wagon. In restraint 310, the chair-like supporting unit 11 of restraint 10 has been replaced by a pliable unit 311 which is formed by a plurality of straps U, L, and M (see FIG. 14) arranged so as to encompass the seat back section BB. In the case of a two door, four passenger vehicle, because of the pliability of unit 311, the unit may remain in encompassing relation with the seat back BB while the latter is being manually tilted forward to permit ingress to and egress from the rear seat of the vehicle. The straps U, L, and M may be formed of suitable webbing material similar to that utilized for the shoulder and lap belts SS and SB provided as standard equipment in current model vehicles.

Figure 14:
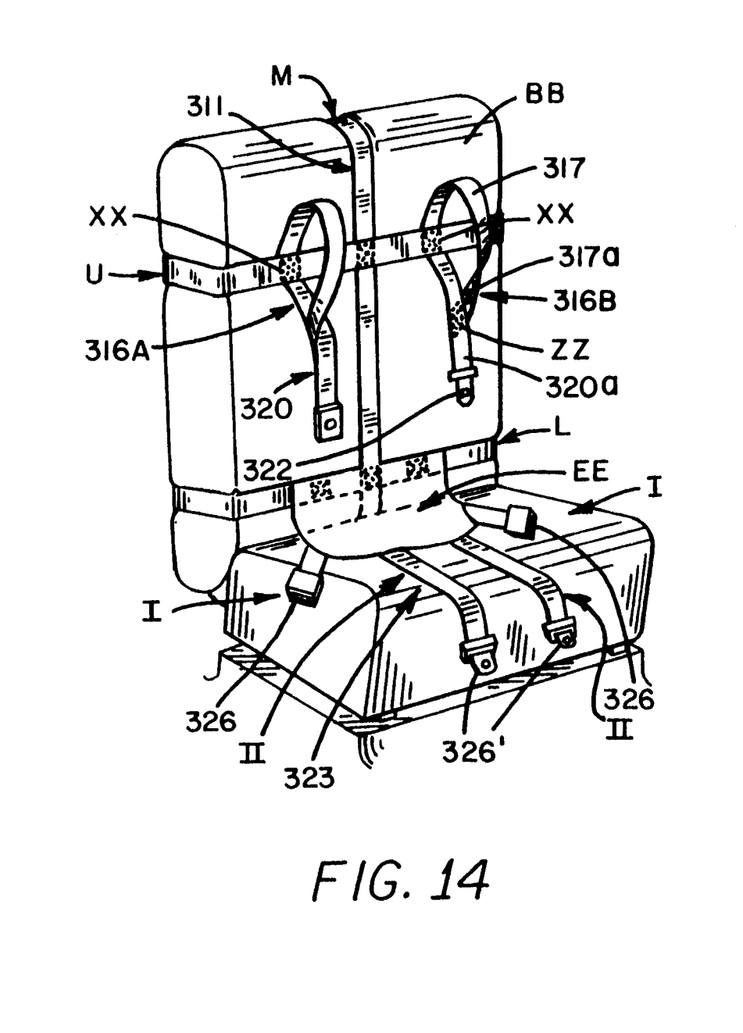
FIG. 14 is similar to FIG. 13 but with the vehicle restraint unoccupied.
Figure 16:
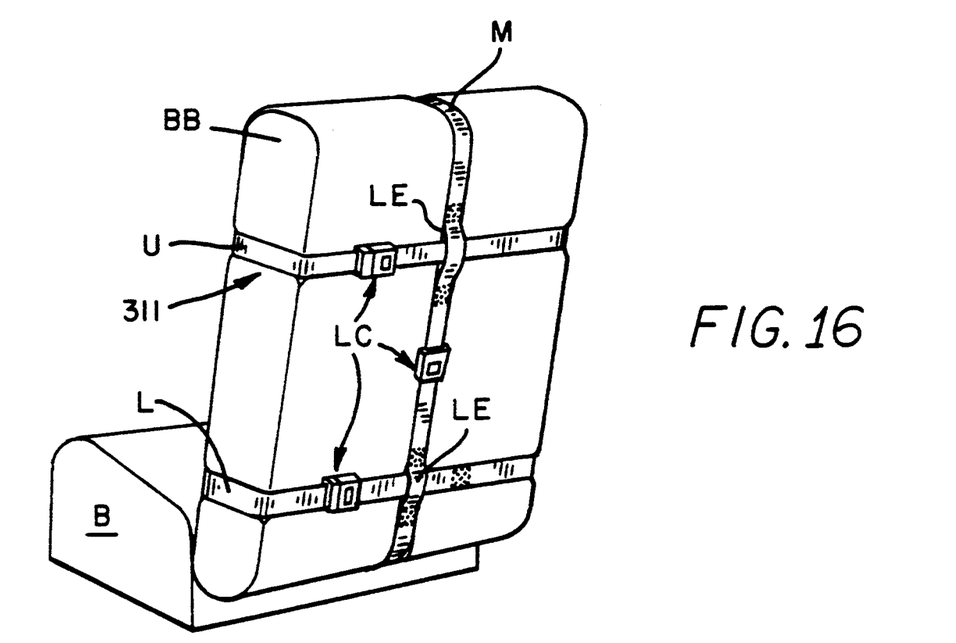
FIG. 16 is a fragmentary rear perspective view of FIG. 14.

As seen in FIGS. 14 and 16, straps U and L are disposed in vertically spaced relation and embrace respectively, the upper and lower portions of the seat back section BB. Strap M, on the other hand, is disposed substantially perpendicular to straps U and L and at, or near, the longitudinal counterline of the seat back section BB. Where straps U and L intersect strap M on the front side of the seat back section BB, they are secured together by stitching or other suitable means, see FIG. 14. On the back side of the seat back section, see FIG. 16, the strap M may be provided with longitudinally spaced loops LE through which the respective straps U and L extend. Each strap U, L and M have conventional manually releasable lock components LC mounted on opposite ends thereof. All of the lock components LC are disposed against the back side of the seat back section and thus do not engage the person W occupying the restraint 310. In addition to the lock components LC, each strip is provided with conventional means, not shown, for selectively adjusting the length of the strap so that the unit 311 will snugly embrace the seat back section.

Figure 15:
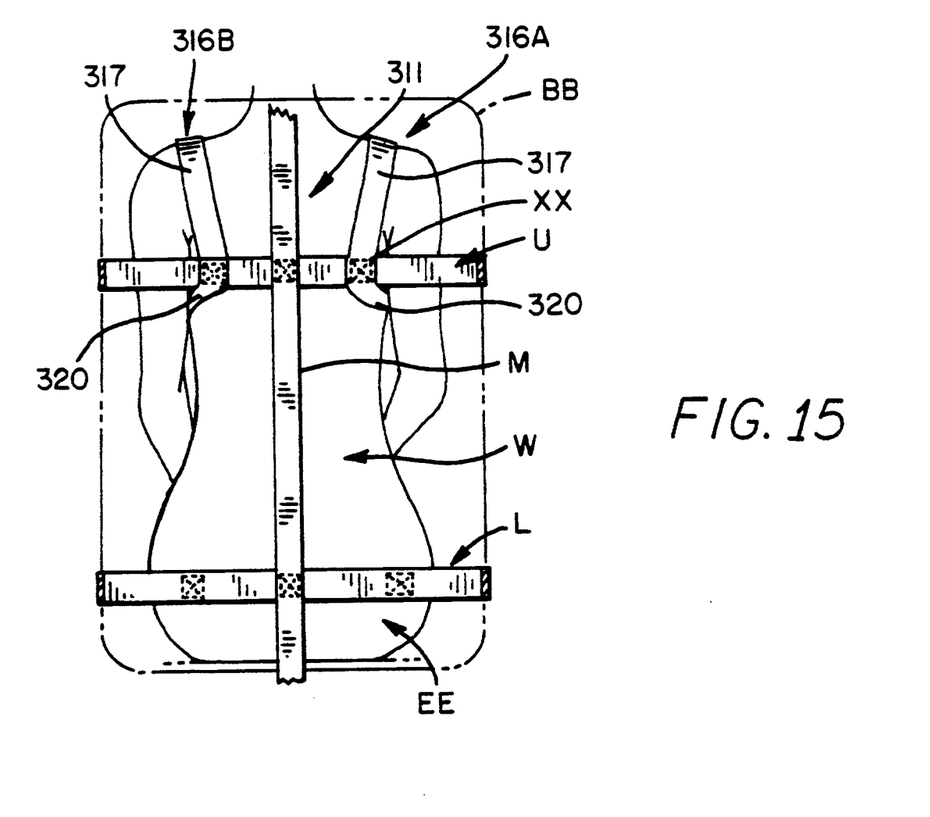
FIG. 15 is a fragmentary sectional view taken along line 15—15 of FIG. 13, but showing in phantom lines an outline of the back section of the vehicle seat.

As seen in FIGS. 14 and 15, there is secured by stitching or the like XX to the portion of unit upper strap U, engaging the front side of the seat back section BB, a pair of laterally spaced first restraint members 316A and 316B. Each first restraint member is of like construction and formed of flexible webbing material, similar to that used for straps U, L and M. The first restraint members 316A and 316B are spaced substantially equidistant from unit strap M.

Each first restraint member 316A, 316B has a segment 317 thereof extending upwardly and forwardly of the unit strap U and is adapted to overlie one shoulder of the pregnant woman W. Each segment 317 may be provided with conventional means, not shown, for varying the length thereof to suit the physical dimensions of the woman. Extending downwardly and forwardly of the unit strap U is a chest-engaging segment 320. The forward distal end 317a of segment 317 is secured to the chest-engaging segment 320 at a location ZZ which is a predetermined distance from stitching XX and the distal end 320a of segment 320 forming an opening through which one arm of the woman extends, see FIG. 13. Secured to the distal end 320a of each chest-engaging segment 320 is a conventional manually releasable lock component 322. When the first restraint members 316A and 316B are in the operative or engaged mode, the chest-engaging segments 320 are interconnected by the lock components 322 whereupon the interconnected segments 320 are locked above the pregnant woman's breast region BR. At the same time, the woman's arms extend through corresponding openings formed in the first restraint members 316A, 316B, see FIG. 13. Thus, movement of the woman's arms are not restricted.

As seen in FIG. 14, the restraint 310 is provided with a second restraint member 323 which includes a flexible apron-like extension EE fixedly attached to the portion of the unit lower strap L which is engaging the front side of the seat back BB. The extension EE is centrally located on the unit lower strap L and is of sufficient size and shape that it will overlie a portion of the upper surface of the seat bottom section B and will subtend at least a portion of the woman's buttock, see FIGS. 14 and 15. The extension is pliable and conforms substantially to the contour of the exposed upper surface of the seat bottom section B when engaging the buttock.

Attached to the periphery of the extension EE are two pairs of flexible straps I' and II' which cooperate with one another to encompass the thigh regions T of the woman in the groin area. The straps of pair I', sometimes referred to as the outside pair, extend laterally outwardly from corresponding first peripheral segments of the extension and the distal end of each strap has a conventional lock component 326 attached thereto. The lock component 326 of each strap I' is preferably located between the seat and the door of the vehicle.

The straps comprising the other pair II', sometimes referred to as the inside pair, are of greater length than the straps of pair I' and extend outwardly from corresponding second peripheral segments of the extension EE. The straps of the second pair II' are located a greater distance from the unit lower strap L to which the extension is attached than the strap I'. The distal end of each strap of the second pair II' has attached thereto a conventional lock component 326' which is complemental to lock component 326. The straps of the second pair II' may be provided with conventional means, not shown, for adjusting the lengths thereof so as to comfortably and properly encompass the thigh regions T of the woman. As in the case of the previously described vehicle safety restraint 10, the engagement between the straps of the second restraint member 323 and the woman's thigh regions occurs in the groin area beneath the gravid uterus region GU and thus, will not impinge on such vulnerable regions and cause trauma if the vehicle should suddenly stop.

When restraint 310 is secured to the seat back section, the standard shoulder strap SB provided on the vehicle may be positioned between the seat back section BB and the unit 311, or between the unit 311 and the dorsal torso region of the woman and then locked in place, thus, restraining accidental forward tilting of the seat back section BB.

Figure 17:
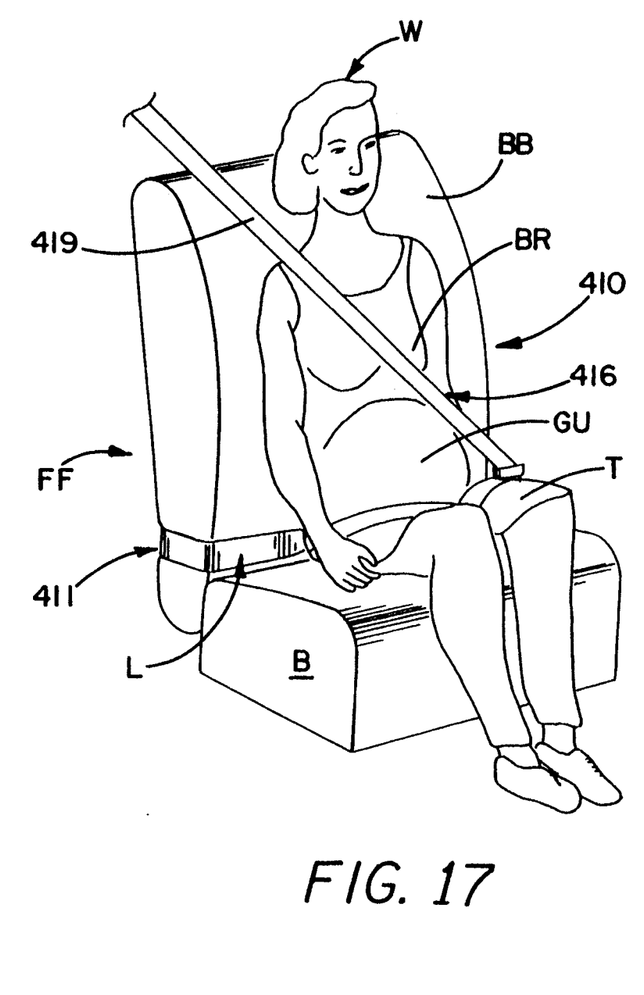
FIG. 17 is a fragmentary perspective view of an alternate embodiment of the improved vehicle restraint shown mounted on the back section of a conventional vehicle seat and utilizing a shoulder belt with a pregnant woman occupying the seat.
Figure 18:
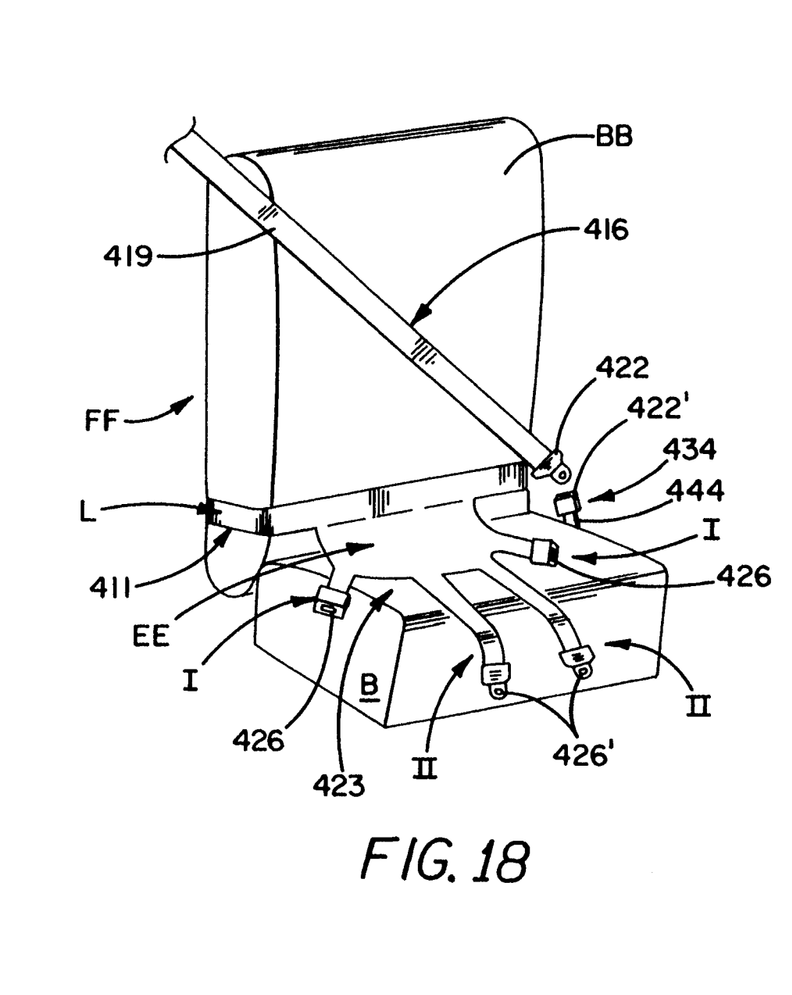
FIG. 18 is similar to FIG. 17 but with the vehicle restraint unoccupied.
Figure 21:
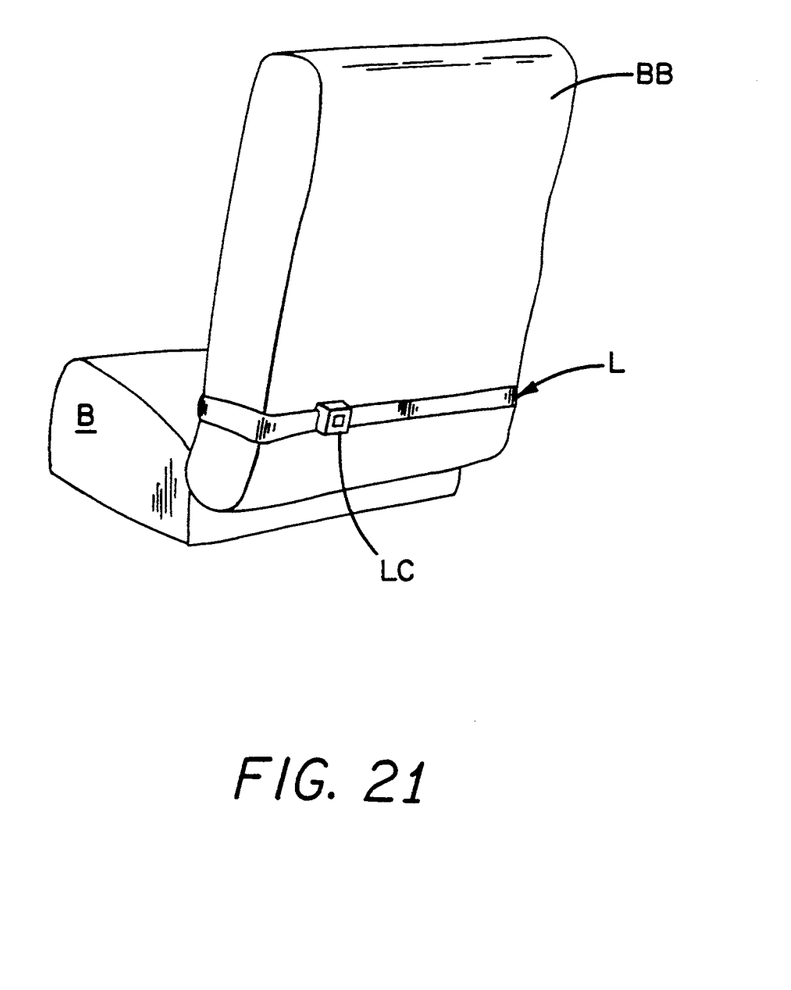
FIG. 21 is a fragmentary rear perspective view of FIGS. 18 and 20.

FIGS. 17, 18 and 21 disclose an alternate embodiment 410 of the improved vehicle restraint which can be fitted to the seat back section BB of any vehicle seat FF which is so constructed to permit access to the posterior and inferior as well as the anterior aspect of the seat back section BB. Similarly to restraint 310, in restraint 410, the chair-like supporting unit 11 of restraint 10 has been replaced by a pliable unit 411 which is formed by a strap L arranged so as to encompass the seat back section BB. Restraint 410 additionally includes first restraining members 416, 434 which are supported by independent structure such as the vehicle's chassis or in any other manner providing sufficient strength. As with pliable unit 311, pliable unit 411 may remain in encompassing relation with the seat back BB while the latter is being manipulated. Pliable unit 411 is very similar to the pliable unit 311 of restraint 310 except that it does not include either vertical strap M, which is disposed on or near the longitudinal center line of the seat back section BB, or strap U which is disposed horizontally to embrace the upper portion of the seat back section BB.

As seen in FIGS. 18 and 21, strap L is disposed horizontally and embraces the lower portion of the seat back section BB. Strap L includes a conventional lock component LC mounted at the distal ends of strap L. As shown in FIG. 21, lock component LC is disposed against the back side of the seat back section and thus does not engage the person W occupying restraint 410. In addition to the lock component LC, strap L is provided with conventional means, not shown, for selectively adjusting the length of the strap so that the unit 411 will snugly embrace the seat back section BB. By properly adjusting strap L so that it fits snugly around seat back section BB, strap L is held in position at the lower portion of the seat back. Accordingly, unit 410 does not require a longitudinal strap to maintain its position on the seat back section SB of the seat; however, it is to be recognized that such additional securing straps may be included with the unit.

The location of lock component LC of unit 411 is such that the lock component is easily accessible to the person W allowing restraint 410 to be easily installed and removed by a person W such as a pregnant woman. As a result, a person W using restraint 410 can easily move it from one vehicle to another vehicle with relative ease, thereby permitting the person the freedom to travel in many vehicles instead of being confined to using just one. Moreover, the ease with which restraint 410 can be transferred from one vehicle to another or from one seat to another further decreases the chances that a pregnant woman would find herself in a situation where she may forego the use of safety belts altogether or attempt to use only the shoulder belt.

As seen in FIGS. 17 and 18, there is secured to the vehicle by conventional means, not shown, first restraint members 416, 434. First restraint member 416 includes strap 419 and lock component 422. First restraint member 434 includes lock component 422' and anchor strap 444 which is independently anchored to the vehicle in any one of a number of conventional manners. The first restraint member is of like construction and formed of flexible webbing material to that of strap L. The first restraint member may take on multiple forms consistent with the description herein including the preferred embodiment which is that of a vehicle shoulder strap. In such alternative, the strap may be secured to the vehicle by such conventional means as a retractable locking mechanism in the ceiling, floor or door post of the vehicle.

The strap 419 of first restraint members 416, 434 is adapted to extend downwardly and across the chest of the pregnant woman W. Secured to the distal end of strap 419 is a conventional manually releasable lock component 422. When the first restraint is in the operative or engaged mode, lock component 422 of chest-engaging strap 419 is connected to lock component 422' of anchoring strap 444, which is partially shown in FIG. 18. In the operative or engaged mode, strap 419 extends over the shoulder of the pregnant woman and over her chest between her breasts to connect with anchoring strap 444 above the gravid uterus region thereby preventing impingement of the gravid uterus region upon the vehicle suddenly stopping.

As seen in FIG. 18, the restraint 410 is provided with a second restraint member 423 which includes a flexible apron-like extension EE fixedly attached to the portion of the unit strap L which engages the front side of the seat back BB. Almost identically to the extension of restraint 310, extension EE is centrally located on the unit strap L and is of sufficient size and shape that it will overlie a portion of the upper surface of the seat bottom section B and will subtend at least a portion of the woman's buttock, see FIGS. 17 and 18. As in restraint 310, the extension is pliable and conforms substantially to the contour of the exposed upper surface of the seat bottom section B when engaging the buttock.

Attached to the periphery of the extension EE are two pairs of flexible straps I and II which cooperate with one another to encompass the thigh regions T of the woman in the groin area. The straps of pair I, sometimes referred to as the outside pair, extend laterally outwardly from corresponding first peripheral segments of the extension and the distal end of each strap has a conventional lock component 426 attached thereto. The lock component 426 of each strap I is preferably located so as to be disposed at the lateral aspect of the woman's thigh.

As with restraint 310, the straps comprising the other pair II, sometimes referred to as the inside pair, are of greater length than the straps of pair I and extend outwardly from corresponding second peripheral segments of the extension EE. The straps of the second pair II are located a greater distance from the unit lower strap L to which the extension is attached than the strap I. The distal end of each strap of the second pair II has attached thereto a conventional lock component 426' which is complemental to lock component 426. The straps of the second pair II may be provided with conventional means, not shown, for adjusting the lengths thereof so as to comfortably and properly encompass the thigh regions T of the woman. As in the case of the previously described vehicle safety restraint 10, the engagement between the straps of the second restraint member 423 and the woman's thigh regions occurs in the groin area beneath the gravid uterus region GU and thus, will not impinge on such vulnerable regions and cause trauma if the vehicle should suddenly stop.

Figure 19:
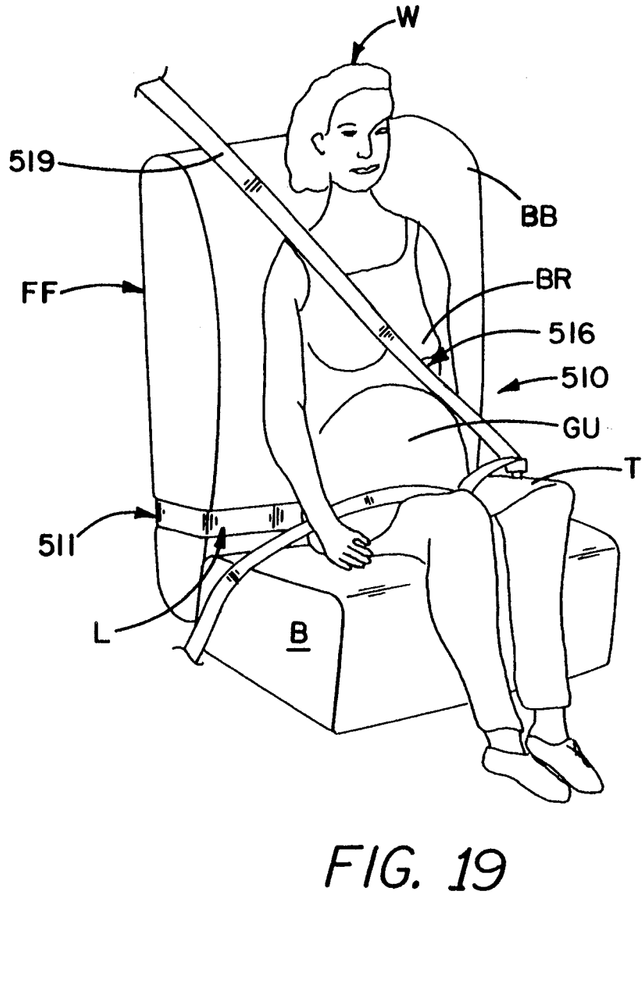
FIG. 19 is a fragmentary perspective view of another embodiment of the improved vehicle restraint shown mounted on the back section of a conventional vehicle seat and utilizing a shoulder and lap belt with a pregnant woman occupying the seat.
Figure 20:
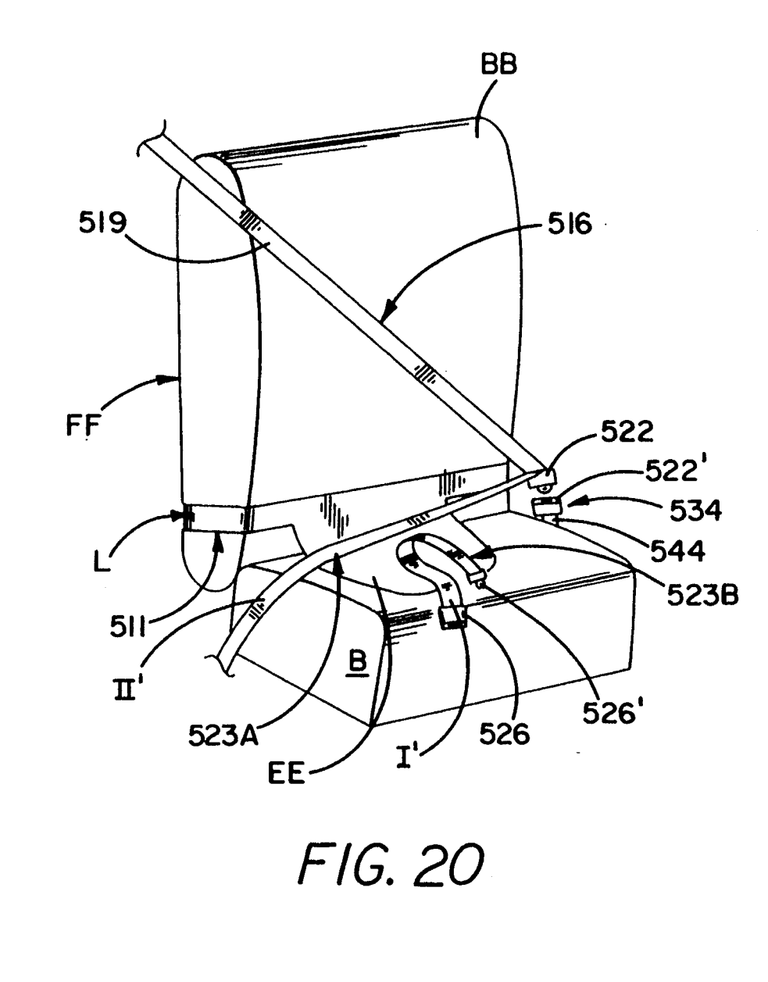
FIG. 20 is similar to FIG. 19 but with the vehicle restraint unoccupied.

FIGS. 19–21 disclose an alternate embodiment 510 of the improved vehicle restraint which, similar to the 310 and 410 embodiments, can be fitted to the seat back section BB of any vehicle seat FF. In restraint 510, the chair-like supporting unit 11 of restraint 10 has been replaced by a pliable unit 511 which is formed by a strap L arranged so as to encompass the seat back section BB. Similarly to pliable units 311 and 411, pliable unit 511 may remain in encompassing relation with the seat back BB while the latter is being manipulated.

As seen in FIGS. 20 and 21, strap L is disposed horizontally to embrace the lower portion of the seat back section BB. Strap L includes a conventional lock component LC mounted on the distal ends of strap L. Similarly to the embodiment 410, lock component LC of the restraint is disposed against the back side of the seat back section and thus does not engage the person W occupying the restraint, see FIG. 21. In addition to the lock component LC, strap L is provided with conventional means, not shown, for selectively adjusting the length of the strap so that the unit 511 will snugly embrace the seat back section BB. By properly adjusting strap L so that it fits snugly around seat back section BB, strap L is held in position at the lower portion of the seat back. As with restraint 410, unit 511 may be provided with additional straps to further secure it to seat back section BB. Similarly to restraint 410, the location of lock component LC is such that the lock component is easily accessible to the person W so that restraint 510, can be easily installed and removed by a person W such as a pregnant woman.

As seen in FIGS. 19 and 20, there is secured to the vehicle by conventional means, not shown, first restraint members 516, 534 and one of the second restraint members 523A. First restraint members 516, 534 include strap 519, lock component 522 and anchoring strap 544. First restraint members 516, 534 are of like construction to that of strap L and are similarly formed of flexible webbing material. The first restraint members may take on multiple forms consistent with the embodiment described herein such as that of a vehicle shoulder strap.

Strap 519 of first restraint member 516 is adapted to extend downwardly and across the chest of the pregnant woman W. Strap 519 is secured at one end to the vehicle by conventional means such as a retractable locking mechanism in the ceiling or door of the vehicle. Secured to the distal end of strap 519 is a conventional manually releasable lock component 522. When the first restraint is in the operative or engaged mode, lock component 522 of chest-engaging strap 519 is connected to lock component 522' of anchoring strap 544, which is partially shown in FIG. 20. Besides connecting to strap 519 of the first restraining members, anchoring strap 544 may secure member 523A of the second restraint members to the vehicle. In the engaged mode, strap 519 extends over the shoulder of the pregnant woman and across her chest between her breasts to connect with the anchoring member above the gravid uterus region thereby preventing impingement thereon in the event the vehicle suddenly stops.

As seen in FIG. 20, the restraint 510 is provided with second restraint members 523A, 523B. Each member 523A, 523B is of like construction and may be formed of the same synthetic material used for the first restraint member. Second restraint member 523B includes a flexible apron-like extension EE fixedly attached to the portion of the unit strap L which engages the front side of the seat back BB. Almost identically to the extension of restraint 310 and 410, extension EE is centrally located on the unit strap L and is of sufficient size and shape that it will overlie a portion of the upper surface of the seat bottom section B and will subtend at least a portion of the woman's buttock, see FIGS. 19 and 20. As noted, the extension is pliable and conforms substantially to the contour of the exposed upper surface of the seat bottom section B when engaging the buttock.

Attached to the extension EE is a flexible strap I' which cooperates with flexible strap II' to encompass the thigh regions T of the woman in the groin area. The flexible strap I' is secured by stitching or the like XX to extension EE at a forwardly located and substantially centered position. Flexible strap I' is secured to extension EE so that, when the seat is occupied by a woman, it is disposed between the thighs T of the seated woman. After the woman is seated, flexible strap II' is brought across the lap of the woman and secured to anchoring member 534 through the use of conventional locking component 522. Once flexible strap II' of the second restraint is secured, second restraint member 523B is brought up between the thighs of the woman to engage and encompass the flexible strap II'. As shown, second restraint member 523B cooperates with second restraint member 523A, by encircling and deforming restraint member 523A, causing it to conform to the contour of the anterior thighs of the seated woman. Thereby, second restraint members 523A, 523B encompass the thigh regions T of the seated woman W and prevent strap II' from riding up on the seated woman an impinging on the gravid uterus GU.

Strap I' is provided with manually releasable locking components 526, 526' at its distal ends to securely engage and restrain strap II'. Although the drawings illustrate the use of locking components comprising buckles, any form of releasable connecting means could be sufficient such as clasps, etc. In addition, a conventional adjustable means may be provided for strap I' so that second restraint member 523A can be deformed according to the desire of the woman. In the preferred embodiment, second restraint member 523B is adjusted so that the strap I' is short and significantly deforms strap II' into following the contour of the thighs T of the seated woman. As a result, each thigh region of the seated woman is engagingly encompassed in such a manner that in the case of a sudden stop or collision, the second restraint members 523A, 523B cooperate with each other to prevent the impingement and possible injury to the gravid uterus GU.

While the various improved vehicle restraints are of simple construction, they nevertheless provide effective protection for the user, and do not unduly restrict the woman's or child's arm movement.

Furthermore, the restraint 310, 410 and 510 may remain attached to the seat back section when the latter is manually tilted forward.

I claim:

1. A vehicle safety restraint for avoiding trauma to a fetus or the uterus region of a woman seated in a motor vehicle, said restraint comprising flexible first restraint members releasably encompassing the upper torso region of the seated woman above the gravid uterus region, said first restrain members including a first member and a second member, said first member being securely coupled to the vehicle and extending from above the shoulder of the seated woman diagonally across her chest, said second member being securely coupled to the vehicle and extending in an area adjacent the woman, said first member being releasably secured to said second member by complementary lock components; flexible second restraint members releasably encompassing each thigh region of the seated woman in a groin area below the gravid uterus region, said second restraint members including a pliable apron-like member for at least partially subtending the seated woman, said apron-like member including attachment members with releasable lock components for removably securing said second restraint members to a vehicle seat, said second restraint members further including a pair of first flexible restraint members connected to and projecting laterally outwardly from first peripheral segments of said apron-like member and a pair of second flexible restraint members connected to and projecting laterally outwardly from second peripheral segments of said apron-like member, said first and second pairs of flexible restraint members being provided with complemental lock components whereby the lock components of corresponding restrain members of said pairs are adapted to interlock with one another and individually encompass each thigh of the seated woman in a groin area to prevent said second restraint from moving from the thigh region of the seated woman to her gravid uterus region, said second restraint members being adjustable independently of said first restraint members; said first and second restraint members being disposed when engaging a seated woman so as not to impinge upon the gravid uterus region of the woman, thereby curtailing injury to the fetus or uterus region of the seated woman in the event of sudden deceleration.

2. The vehicle safety restraint of claim 1 wherein said attachment members with releasable lock components are configured so as to permit said second restraint members to be secured to the lower area of the back of a vehicle seat.

3. The vehicle safety restraint of claim 1 wherein each thigh of the seated woman is fully and separately encompassed by said second restraint members.

4. A vehicle safety restraint for avoiding trauma to a fetus or the uterus region of a woman seated in a motor vehicle, said restraint comprising flexible first restraint members releasably encompassing the upper torso region of the seated woman above the gravid uterus region, said first restraint members including a first member and a second member, said first member being securely coupled to the vehicle and extending from above the shoulder of the seated woman diagonally across her chest, said second member being securely coupled to the vehicle and extending in an area adjacent the woman, said first member being releasably secured to said second member by complementary lock components; flexible second restraint members releasably encompassing each thigh region of the seated woman in a groin area below the gravid uterus region, said second restraint members including a pair of first flexible restraint members and a pair of second flexible restraint members securely coupled to the vehicle, said first and second pairs of flexible restraint members being provided with complemental lock components whereby the lock components of corresponding restraint members of said pairs are adapted to interlock with one another and individually encompass each thigh of the seated woman in a groin area to prevent said second restraint from moving from the thigh region of the seated woman to her gravid uterus region, said second restraint members being adjustable independently of said first restraint members; said first and second restraint members being disposed when engaging a seated woman so as not to impinge upon the gravid uterus region of the woman, thereby curtailing injury to the fetus or uterus region of the seated woman in the event of sudden deceleration.

5. The vehicle safety restraint of claim 4 wherein said second restraint members include a pliable apron-like member for at least partially subtending the seated woman.

6. The vehicle safety restraint of claim 5 wherein said pliable apron-like member includes attachment members with releasable lock components for removably securing said second restraint members to a vehicle seat.

7. The vehicle safety restraint of claim 5 wherein said pair of first flexible restraint members is connected to and projects outwardly from first peripheral segments of said apron-like member and said pair of second flexible restraint members is connected to and projects outwardly from second peripheral segments of said apron-like member.

* * * * *